UNITED STATES PATENT OFFICE.

JOHN H. LONG, OF CHICAGO, ILLINOIS, ASSIGNOR TO CHISHOLM, BOYD AND WHITE COMPANY, A CORPORATION OF ILLINOIS.

PROCESS OF BRIQUETING IRON-BEARING SUBSTANCES.

SPECIFICATION forming part of Letters Patent No. 711,059, dated October 14, 1902.

Application filed July 21, 1902. Serial No. 116,338. (No specimens.)

*To all whom it may concern:*

Be it known that I, JOHN H. LONG, a citizen of the United States, residing in the city of Chicago, county of Cook, and State of Illinois, have invented a new and useful Improvement in Processes of Briqueting Iron-Bearing Substances, of which the following is a specification.

My invention relates to processes for briqueting iron-bearing substances, such as soft iron ores and flue-dust formed in smelting iron or iron-bearing ores, and is related to the invention described in a companion application for patent for process of briqueting iron-bearing substances filed by me simultaneously herewith, Serial No. 116,339. As stated in said companion application, I have found that a hard and lasting briquet can be produced by employing a bond of common commercial salt corrected by means of soda. Salt, however, is not adhesive and has little if any tendency to bind the particles of iron-bearing substances together until after the rusting action has begun. This does not occur to any appreciable extent until after the drying part of the process is well in course of progress. It becomes necessary, therefore, in briqueting certain materials—for example, non-coherent flue-dust—to provide means for attaining sufficient strength in the newly-compressed or "green" briquets to withstand the effects of handling from the time they leave the pressing-machine until they are dried.

The object of this invention is to produce tough and non-absorptive salt-bonded briquets which shall have sufficient plasticity and coherence to be readily handled in the green state without danger of breakage.

In briqueting by this process a strong brine is prepared by dissolving commercial common salt in preferably hot water, the best proportion being one part, by weight, of the salt to two parts water. Commercial common salt contains moisture-absorbing impurities, the most important one by far being calcium chlorid. In order to eliminate the harmful effects of the calcium chlorid, sodium carbonate, usually known as "soda," is added to the brine in the proportion of ten pounds of soda to each two thousand pounds of salt in the brine. The resulting chemical reactions, so far as I am informed, produce calcium carbonate and sodium chlorid in the place of the calcium chlorid and sodium carbonate. The resulting calcium carbonate and sodium chlorid do not either of them attract moisture. Slaked lime is also prepared for use, the preferred method being to introduce water and quicklime (calcium oxid) into a vessel, with the water in considerably the largest proportion. The lime and water are mixed together, and after the slaking action is complete the excess of water is drained off until the lime is approximately of the consistency of soft putty and constitutes what is commonly known as "cream of lime." The lime thus slaked contains approximately equal parts, by weight, of lime and water. The brine treated or corrected with soda and the cream of lime are then mixed with the pulverized flue-dust, iron ore, or other iron-bearing substance in such proportion that for every ninety-five pounds of iron-bearing substances there will be approximately seven and one-half pounds of treated brine and five pounds of cream of lime. In other words, the chief components of the briquets so far as solids are concerned are ninety-five per cent. iron-bearing substances, two and one-half per cent. corrected salt, and two and one-half per cent. lime. The precise method of mixing the bonding ingredients with the iron-bearing substance is not essential; but the type of machine known in the art as a "conveyer-mixer" is well adapted for this purpose. The final mixture is then molded into form by pressure by any suitable means—for example, a mineral press, brick-press, or molding-machine. The briquets thus formed are then dried, preferably, by subjecting them to artificial heat. If the heat be maintained at about 212° Fahrenheit, the briquets will be perfectly "set" at the end of six hours, a period much shorter than that usually required in the processes of briqueting heretofore employed.

Upon examination the briquets formed by my process will be found to be exceedingly hard and tough and to have a rusted appearance upon the surface and through the interior. When broken, the briquets show a clean hard surface of fracture. During the drying the greater part of the water used in dissolving the salt and the part of the water of the cream of lime is driven off, and when the drying and setting action is complete the briquets may be exposed to the moisture of the atmosphere for an indefinite period and may even be immersed in water for days at a time without apparent deterioration.

It is well known that salt has a corrosive action upon iron, especially in the presence of heat and moisture, and it is also known that slaked lime when exposed to the atmosphere or to flue-gases absorbs carbon dioxid and becomes set, forming calcium carbonate, which is, practically speaking, limestone. It is my understanding that during the drying in the production of briquets by my process the wet salt corrodes the particles of iron and rusts them together. The slaked lime is at the same time converted into hard insoluble calcium carbonate and forms a moisture-proof coating for protecting the rust-bonded particles. The protecting lime is not merely on the outside of the briquet, but is present throughout the entire mass thereof, so that in case of fracture there will be no tendency toward absorption of moisture and disintegration.

I have found by experiment that as a rule greater strength and durability in the finished briquets will result from the use of both lime and salt than from the use of lime or salt separately, the total amount of bond remaining the same in both cases—that is to say, if the total amount of bond is to be five pounds in any given amount of iron-bearing substance a better briquet will result if said five pounds consist of both lime and corrected salt than if said five pounds consist of either lime or corrected salt alone.

Artificial heat is not essential to the process for drying the green briquets, but is desirable in order to hasten and perfect the results.

This process is not only applicable to soft iron ores and flue-dust from iron-furnaces, but also to other ores and flue-dust containing iron particles in suitable condition and quantity.

What I claim as new, and desire to secure by Letters Patent, is—

1. The process of briqueting, consisting in mixing non-deliquescent salt, and lime, with iron-bearing substance for bonding the latter and afterward compressing the mixture into form.

2. The process of briqueting consisting in mixing together soda and commercial common salt in such proportions as to render the mixture substantially non-deliquescent; and slaking calcium oxid with water to form cream of lime; then mixing said non-deliquescent salt and cream of lime with iron-bearing substance for bonding the same, and subsequently compressing the final mixture into form.

3. The process of briqueting, consisting in mixing non-deliquescent salt and lime, both in solution and in approximately equal proportions, with iron-bearing substance; then compressing the mixture into form, and drying the resulting briquets, the iron-bearing substance constituting approximately ninety-five per cent. by weight of the dried briquets.

4. The process of briqueting consisting in mixing commercial common salt and soda together in the presence of heat and moisture in the proportion, approximately, of one part of soda to two hundred parts of salt to thereby correct the salt and render the same substantially non-deliquescent; then mixing cream of lime and a solution of the corrected salt, to iron-bearing substance, the corrected salt and lime being in substantially equal proportions, and together weighing about five pounds to every ninety-five pounds of iron-bearing substance; and subsequently compressing the final mixture into form.

5. The process of briqueting consisting in dissolving commercial common salt in water in the proportion approximately of two parts by weight of water to one part salt; then adding soda to the brine in the approximate proportion of one pound of soda to two hundred pounds of salt, and causing chemical reaction between said salt and soda by means of heat; next adding cream of lime, and said treated brine to iron-bearing substance, the cream of lime consisting of approximately equal parts of calcium oxid and water, and the final mixture consisting of approximately fifteen parts brine, ten parts cream of lime and ninety-five parts iron-bearing substance; and subsequently compressing the mixture into form and drying the resulting green briquets.

6. A briquet composed of iron-bearing substance, lime, and non-deliquescent salt, mixed together and compressed into form.

7. A briquet composed of iron-bearing substance, lime, commercial common salt, and soda, mixed together and compressed into form, the soda being chemically combined with the deliquescent ingredients of the salt.

8. A briquet composed of the following ingredients approximately in the proportions named; to wit: iron-bearing substance ninety-five pounds, lime two and one-half pounds, commercial common salt two and one-half pounds, and soda one-eightieth of one pound.

JOHN H. LONG.

Witnesses:
COLBY M. AVERY,
SADIE WOLF.